United States Patent [19]

Brune

[11] 4,333,522
[45] Jun. 8, 1982

[54] CASINGS FOR HEAT EXCHANGERS AND BURNER/RECUPERATOR ASSEMBLIES INCORPORATING SUCH CASINGS

[76] Inventor: Heinz Brune, P.O. Box 3201, Station C, Hamilton, Ontario, Canada, L8H 7K6

[21] Appl. No.: 241,896

[22] Filed: Mar. 9, 1981

Related U.S. Application Data

[63] Continuation-in-part of Ser. No. 10,186, Feb. 7, 1979, Pat. No. 4,262,740.

[51] Int. Cl.³ .............................................. F28F 9/00
[52] U.S. Cl. ........................................ 165/69; 165/76; 165/82; 165/145; 165/165; 165/DIG. 8
[58] Field of Search .................... 165/9.3, 9.4, 67, 69, 165/76, 82, 83, 143–145, 165, DIG. 8

[56] References Cited

U.S. PATENT DOCUMENTS

| | | | |
|---|---|---|---|
| 3,121,559 | 2/1964 | Tippmann | 165/83 |
| 3,315,739 | 4/1967 | Kearney | 165/165 |
| 3,775,972 | 12/1973 | Perpall | 165/69 |
| 3,986,549 | 10/1976 | Huggins et al. | 165/82 |
| 4,139,054 | 2/1979 | Anderson | 165/83 |

FOREIGN PATENT DOCUMENTS 1240897  5/1967  Fed. Rep. of Germany ...... 165/165

*Primary Examiner*—Sheldon J. Richter
*Attorney, Agent, or Firm*—Hirons, Rogers & Scott

[57] ABSTRACT

The invention provides a protective casing for a cube-shaped modular ceramic heat exchanger core, in which the core can easily be installed without danger of leakage between the fluid paths of the core. To this end the core rests in the casing with the edges of one face engaged with a suitable ceramic fibre composition gasket; the opposite face of the same flow path is engaged by another such gasket and the gasket is in turn engaged by a gasket compression member. The compression member is urged into this engagement by strong springs which thereby hold the gaskets in the necessary sealing engagement. In one aspect of the invention the casing is readily changed to provide single or multi-pass of one of the flow paths through the core; such a casing consists of a central portion of the thickness dimension of the core and replaceable end portions which provide the inlet, outlet and respective plenums. In another aspect of the invention the casing provides a central trunk with which a plurality of cores can be used selectively to provide increased heat exchange capacity without substantial increase in pressure drop.

8 Claims, 7 Drawing Figures

CASINGS FOR HEAT EXCHANGERS AND BURNER/RECUPERATOR ASSEMBLIES INCORPORATING SUCH CASINGS

CROSS-REFERENCE TO RELATED APPLICATION

The present application is a continuation-in-part of my earlier application Ser. No. 010,186, filed 7th Feb. 1979, now U.S. Pat. No. 4,262,740, issued Apr. 21, 1981, the disclosure of which is incorporated herein by such reference.

FIELD OF THE INVENTION

The present invention is concerned with improvements in or relating to casings for heat exchangers, and in or relating to burner/recuperator assemblies incorporating such casings, and especially to such casings and assemblies enclosing a ceramic heat exchanger core of unitary structure.

REVIEW OF THE PRIOR ART

A comparatively recent development in the heat exchanger field is the economical production of unitary heat exchanger cores made of ceramic material able to withstand relatively high temperatures, e.g. of the order of 1400° C. The resulting heat exchangers are particularly suitable for use, for example, as heat recuperators or reclaimers for high temperature production furnaces, in which heat from the hot furnace flue gas in one flow path is transferred to the furnace burner combustion air in another flow path to improve combustion and overall fuel efficiency. The core must be enclosed in a casing which provides the necessary fluid inlets and outlets for the paths, and in the prior art structures of which I am aware considerable difficulty has been experienced in sealing the core into the casing in a manner that will avoid leakage of fluid between the flow paths and consequent loss of efficiency. Even if the sealing is effective when the device is new, it is found that in use leakage begins relatively quickly as it is subjected to the drastically changing temperatures encountered in service. The problem is compounded by the difficulty of finding suitable construction materials with sufficiently close coefficients of expansion to avoid the large changes in dimension that result from these drastic changes in temperature.

My prior patent specification Ser. No. 010,186 discloses and claims a casing for a heat exchanger case which is of rectangular parallelopiped shape and has therein two fluid flow paths in heat exchange communication with one another and extending at right angles to one another. Such a casing includes:

a hollow casing body having an internal shoulder to be engaged by a respective face of the core and surrounding a respective fluid path inlet or outlet from the casing body;

a first gasket interposed between the shoulder and the edges of the abutting core face;

a second gasket mounted on the edges of the core face opposite to the said abutting face to seal the join between the said core edges and the casing body;

a gasket compressor member engaging the gasket face of the second gasket opposite to that engaged with the core face edges; and resilient means operative between the gasket compressor member and the casing body to urge the compressor member toward the core face and thereby compress the gaskets into sealing engagement with the respective core edges and the casing body.

At the present time such ceramic heat exchanger cores are only available in capacities of about 1–1.5 million B.T.U's, and this is not sufficient for many potentially valuable applications, so that some provision is required for the operation of a plurality of the cores in parallel with one another.

DEFINITION OF THE INVENTION

It is an object of the present invention to provide a new casing for heat exchanger cores which is adaptable to a wide range of heat exchanger configurations while employing a minimum number of different components.

It is another object to provide a new casing adapted to receive a plurality of such cores operable in parallel with one another.

In accordance with the present invention there is provided a casing for a heat exchanger core which has therein a first plurality of parallel passages extending between two opposite faces of the body and constituting a first fluid flow path having an inlet and an outlet and a second plurality of parallel passages extending between two other opposite faces of the body and constituting a second fluid flow path having an inlet and an outlet and in heat exchange communication with the first path, the casing including:

a hollow casing body having an internal shoulder to be engaged by a respective face of the core and surrounding a respective fluid path inlet or outlet from the casing body;

a first gasket interposed between the shoulder and the edges of the abutting core face;

a second gasket mounted on the edges of the core face opposite to the said abutting face to seal the join between the said core edges and the casing body;

a gasket compressor member engaging the gasket face of the second gasket opposite to that engaged with the core face edges; and resilient means operative between the gasket compressor member and the casing body to urge the compressor member toward the core face and thereby compress the gaskets into sealing engagement with the respective core edges and the casing body;

wherein the said hollow casing body comprises a central portion thereof of a thickness to just accommodate a respective heat exchanger core;

a first end portion removably mounted on said central portion and providing a respective plenum for gases passing through the core;

and wherein the said gasket compressor member comprises a second end portion of the hollow casing body providing another respective plenum for gases passing through the core.

Also in accordance with the invention from another aspect there is provided such a casing, the casing also including a central trunk casing member having common gas inlets thereto for the respective flow paths and common gas outlets therefrom for the respective flow paths; and means for mounting a plurality of said hollow casing bodies on the central trunk casing member each with its inlets connected to the common trunk inlets and its outlets connected to the common trunk outlets.

DESCRIPTION OF THE DRAWINGS

Heat exchange casings and furnace burner recuperator assemblies which are particular preferred embodiments of the invention will now be described, by way of example, with reference to the accompanying diagrammatic drawings wherein.

As much as possible similar parts will be given the same reference number in all the figures of the drawing.

DESCRIPTION OF THE PREFERRED EMBODIMENTS

Figure 2:
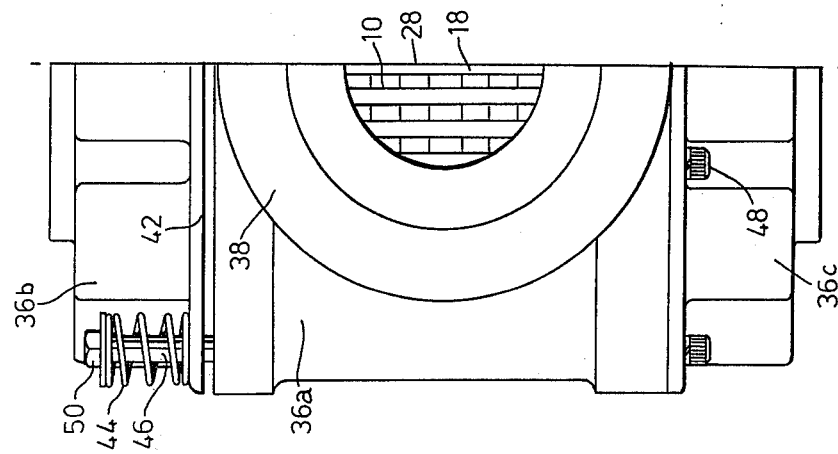
FIG. 2 is a part end elevation of the embodiment of FIG. 1.

The casings of this and the preceding invention are employed with a heat exchanger core 10 which is of rectangular parallelopiped shape, more particularly of cubical shape, of ceramic material, so that it is readily able to withstand fluid temperatures of up to 1400° C., such as are encountered with the flue gases of a high temperature production furnace. The core provides a first flow path constituted by a respective plurality of parallel passages extending from an inlet face 12 to an outlet face 14, the path being intended for example for the passage of combustion air for a furnace hot air burner. The core also provides a second flow path constituted by a respective plurality of parallel passages extending at right angles to the first path passages and in heat exchange relation thereto, this second path extending from an inlet face 16 to an outlet face 18. This second path will for example, receive hot flue gases from the furnace chamber fed by the above-mentioned burner so as to provide preheating for the combustion air.

Figure 1:
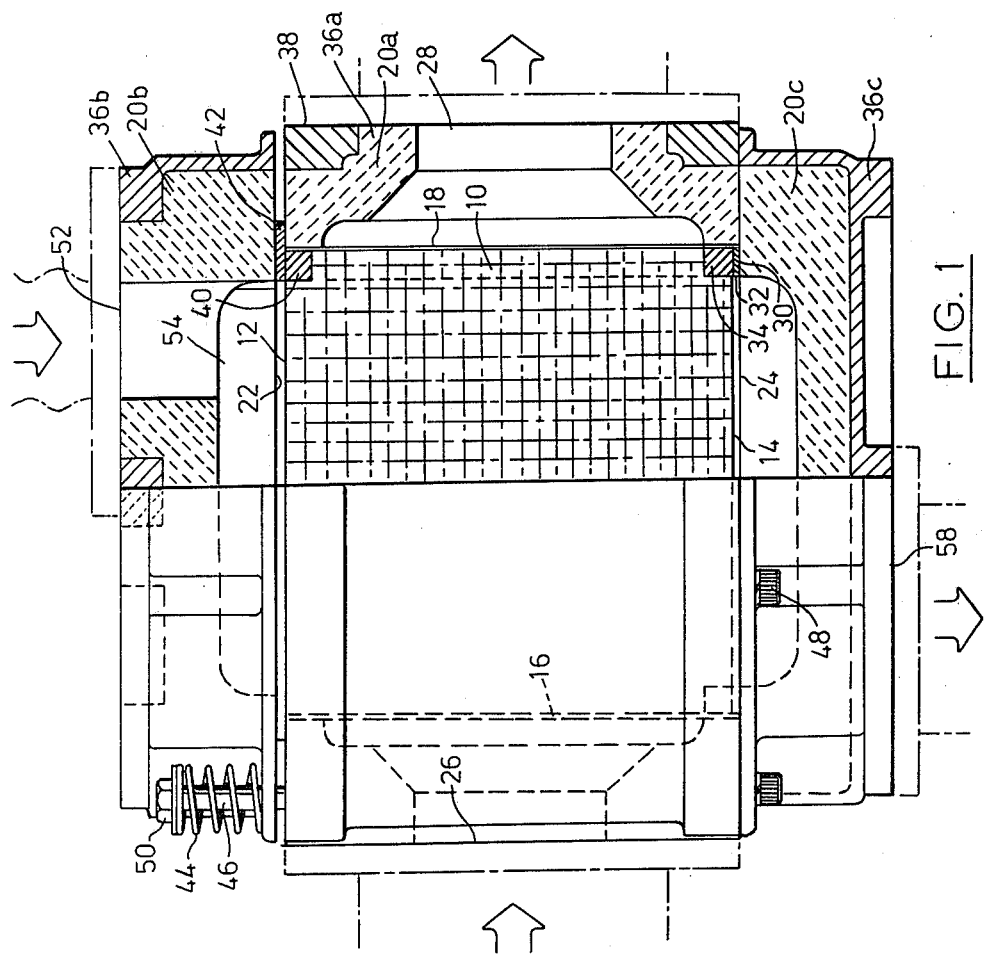
FIG. 1 is a view partly in transverse cross-section and partly in side elevation of a first embodiment comprising a heat exchanger assembly operative with a single pass cross-flow of both of the gases to be heated and cooled respectively.
Figure 3:
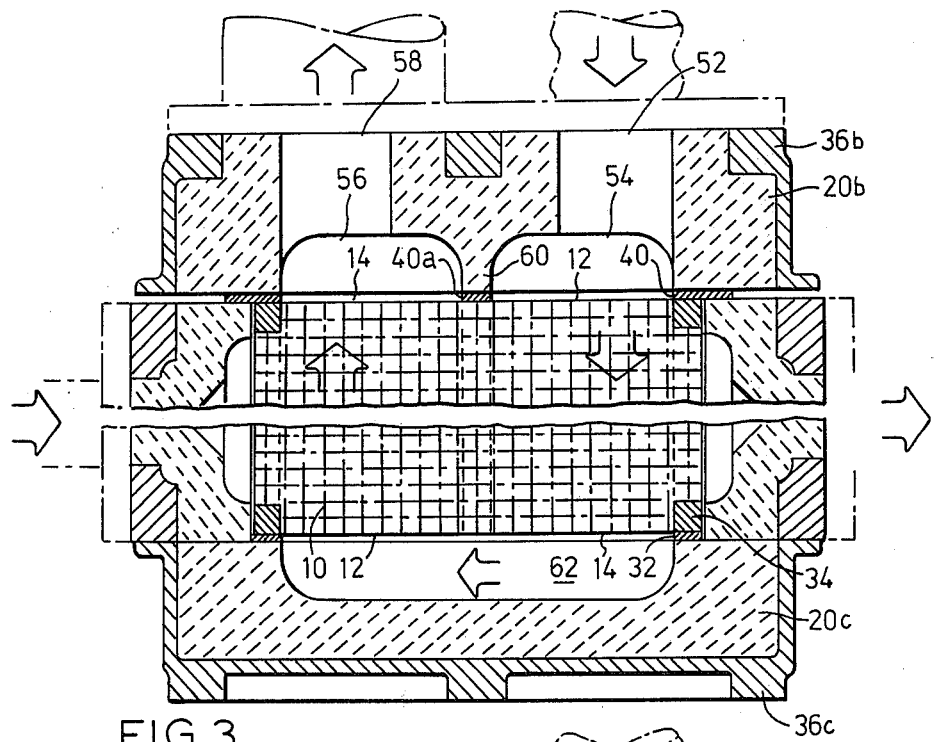
FIG. 3 is a cross-section view similar to FIG. 1 of a second embodiment operative with dual pass of the gas to be heated.

Referring now specifically to FIGS. 1-3, illustrating a heat/exchanger assembly, the casing for this embodiment consists of a hollow refractory body part 20a surrounding the core 10 and having inlet 22 and outlet 24 for the first combustion air path, and inlet 26 and outlet 28 for the second flue gas path. The first path inlet 22 is the only one big enough for the core to pass through, and this is therefore the only opening by which the core can be inserted in the casing. The body 20a provides around the edges of the core outlet face 14, between that face and the outlet 24, a square-circumference shoulder 30 on which rests a square-circumference first gasket 32 of a suitable high temperature ceramic fibre composition. The gasket 32 receives a blanking ring 34 of the same shape and seals the first flow path outlet against leakage of fluid into the second path and consequent loss of efficiency and control of fluid flow. In this embodiment the body 20 is surrounded by a cast metal casing part 36a providing end flanges 38 to which the cooperating flanges of the burner etc., can be connected. A square-circumference blanking ring 40 is mounted at the inlet face 12 and receives a square-circumference gasket 42 that extends around the edges of the core face 12 to seal the first flow path inlet against leakage between the two paths. The body and its surrounding casing are completed by respective separate removable portions 20b, 20c, 36b and 36c. In this embodiment the removable body and casing portions 20b and 36b also constitute a gasket compressor member, and the face of the gasket 42 opposite to that engaged by the blanking member 40, which is in turn engaged by the edges of the core face 12, is engaged by a respective face of the body part 20b.

The resulting gasket compressor member is urged into engagement with the gasket 42 by resilient means constituted by four strong compression coil springs 44 mounted around studs 46 that are rigidly fastened to the casing part 35 and extend freely through holes in casing part 36b. Other forms of resilient means that can be used e.g. Belleville springs, are apparent to those skilled in the art. The gaskets 32 and 42 are thereby constantly urged into sealing engagement with the edges of the core faces, despite any dimensional changes that can occur with change in temperature of the assembly, or with changes resulting from creep of the materials of the assembly with time. The other removable portions 20c and 20b are fastened directly to the central portion 20a and 36a by screws 48.

The core is readily removed at any time very simply and easily by removing nuts 50 from the studs 46 and then removing springs 44. The compressor member can now be lifted off the studs and the core withdrawn through opening 22. It will be seen therefore that at any time the core can be replaced by one of different characteristics, such as flow or heat transfer ability, and the new core sealed without difficulty into the casing and without the danger of subsequent leakage. It will be noted that the gasket compressor member is located at the inlet for incoming air, so that it is at the coolest part of the assembly and will be least affected by temperature changes. The casing parts 36b and 36c will also be provided with flanges by which the casing is fastened to a burner with which it is to be used, and to any connecting pipes required for conveyance of the combustion air and flue gases.

In many applications of the core it is satisfactory simply to pass the combustion air once only through the multiple parallel channels constituting the first path, and the flue gas once only through the multiple parallel channels constituting the second path, and it will be seen that the embodiment of FIGS. 1-3 is arranged to operate in this manner. However, in other applications it may be found that a single pass of either gas does not produce the required temperature change while the quantities of gases involved are such that not all of the channels of the path used need be employed for such a single pass. One solution is of course to use two cores in series with one another, but this is expensive, and it is preferred instead if possible to pass the respective gas in one direction through part only of the channels of the associated path, and then back through the remaining channels to provide a two-pass flow, or as many passes as the core size etc., will permit. The casing construction of the invention permits the adoption of different pass patterns at least in the first flow path with a minimum of different component parts.

Referring now to the single pass construction of FIGS. 1 to 3 it will be seen that the body part 20a and the casing part 36a are of about the same thickness dimension in the direction of flow in the first path as the core 10, while since the parts 20b, 20c, 36b and 36c are separate from the central parts and removably attached thereto, they can be exchanged at will without the need to modify the central parts. The body part 20b is arranged to provide an off-set inlet 52 for the ingoing combustion air, feeding into a distribution plenum recess 54 in the part, the plenum distributing the gas over the entire inlet face 12 of the core. Similarly, the other body part 20c provides a collection plenum recess 56 which collects the gas issuing from the core 10 over the entire outlet face 14 and feeds it to an outlet 58.

Figure 4:
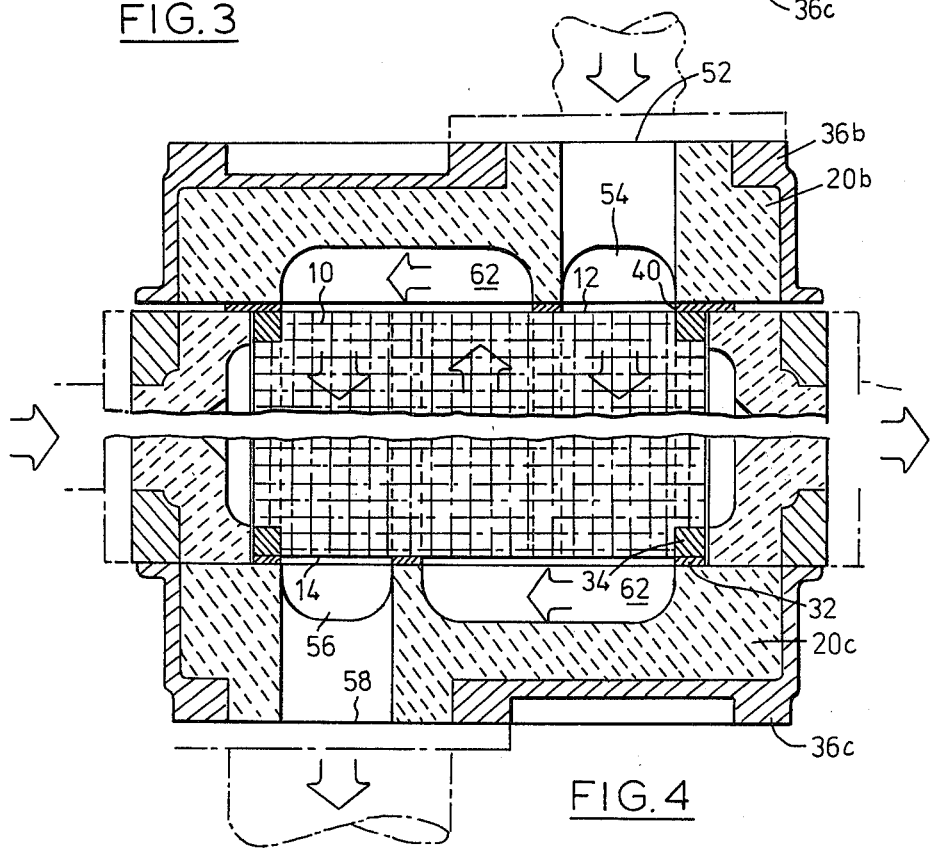
FIG. 4 is a cross-section similar to FIGS. 1 and 3 of a third embodiment with triple pass of the gas to be heated.

If for example, it is found that the capacity of the core in the first combustion air path is not fully utilized by a single pass, but can be more fully or more efficiently utilized by two successive passes through the single core, then the structure of FIG. 4 can be used. It will be seen that the part 20b now provides both the inlet 52 and the outlet 58 and the respective plenums 54 and 56, which are separated from one another by an integral barrier 60, the gasket 40 having a corresponding registering bridge portion 40a. The part 20c has no outlet therefrom and provides only a connecting transfer plenum recess 62 to transfer gas issuing from one outlet part of the face 14 to the other part of the same face.

Figure 5:
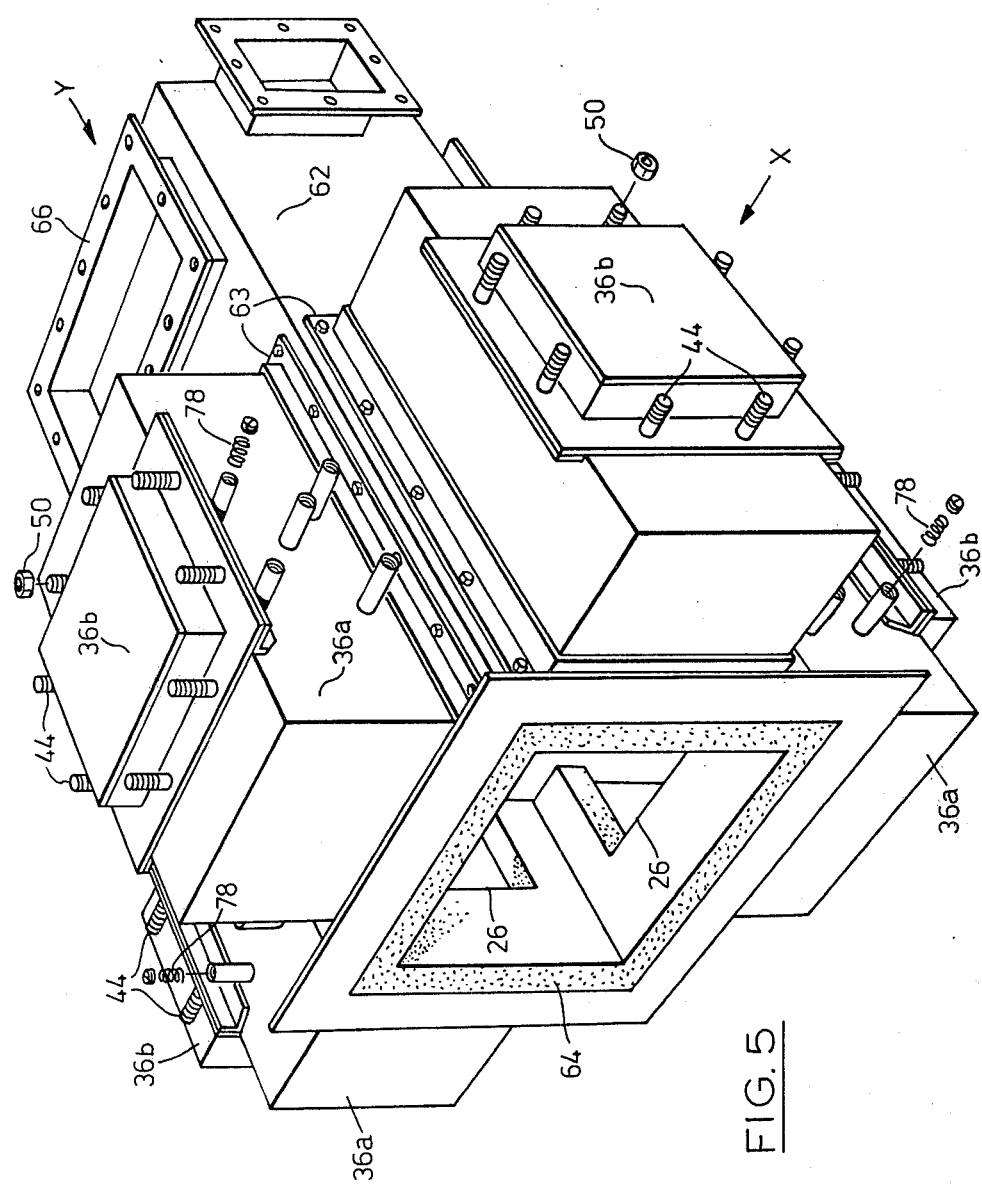
FIG. 5 is a perspective view of a casing accomodating a plurality of cores operative in parallel with one another.

If it is found that the capacity of the core is more fully or more efficiently utilized by three successive passes of the gas through the core in the first path then the structure of FIG. 5 can be used. In this embodiment the body parts 20b and 20c are the same, the part 20b providing the inlet 52, distribution-plenum 54, and transfer plenum 62, while the part 20c provides outlet 58, collection plenum 56 and a respective transfer plenum 62. The transfer plenums are separated from the inlet and outlet plenums respectively by barriers 60 which cooperate with respective gasket bridge portions 40a and 32a.

It will be seen therefore that I have provided a simple flexible structure retaining the advantages of the sealing structure of my original invention, while permitting more efficient utilization of a standard single size core.

The situation may also arise that the cores available are of smaller capacity than is desirable for the most efficient operation. For example at this time GTE Sylvania have available two basic cores, one measuring 30 cm. by 30 cm. by 30 cm., while the other measures 30 cm., by 30 cm., by 45 cm., the two cores being respectively of 1 million and 1.5 million B.T.U. capacity. The structure of FIGS. 5 to 7 permits up to four of these cores to be used in parallel with one another so as to provide the desired increased heat exchange capacity without substantial increase in pressure drop through the device.

It will be seen that in general the casing comprises a central trunk 62 of square transverse cross-section having a body part 20a and casing part 36a fastened to each of its four walls so as to accomodate four cores 10, one in each casing part. Thus each casing part 36c fits snugly and removably within a rectangular frame formed by angles 63 fastened to the trunk casing walls. The gasket compressor member for each core consists of the body part 20b and 36b urged into engagement by respective sets of springs 44. Hot flue gas passes into the trunk casing 62 via common inlet 64 and then passes via respective inlets 26 to the separate cores; after passing through the four cores in parallel the gas streams exit from respective outlets 28 to recombine into a single annular stream in a respective annular conduit 66, this annular stream discharging from the trunk via common outlet 68.

Figure 6:
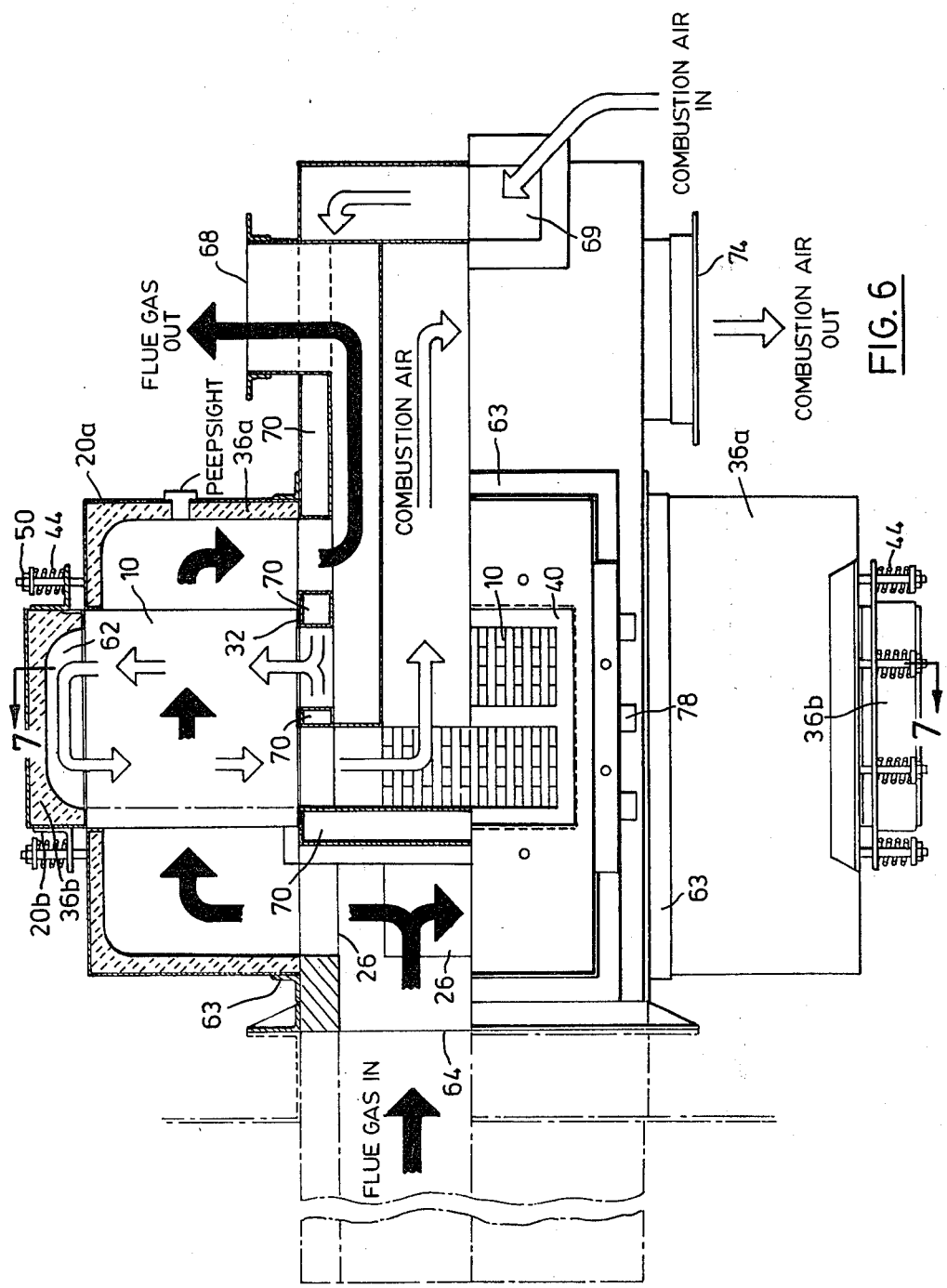
FIG. 6 is a part side elevation and part cross-section the lower part being the side elevation in the direction of arrow X in FIG. 5 with a casing cover removed, while the upper part of the figure is a cross-section on the line B—B in FIG. 7.
Figure 7:
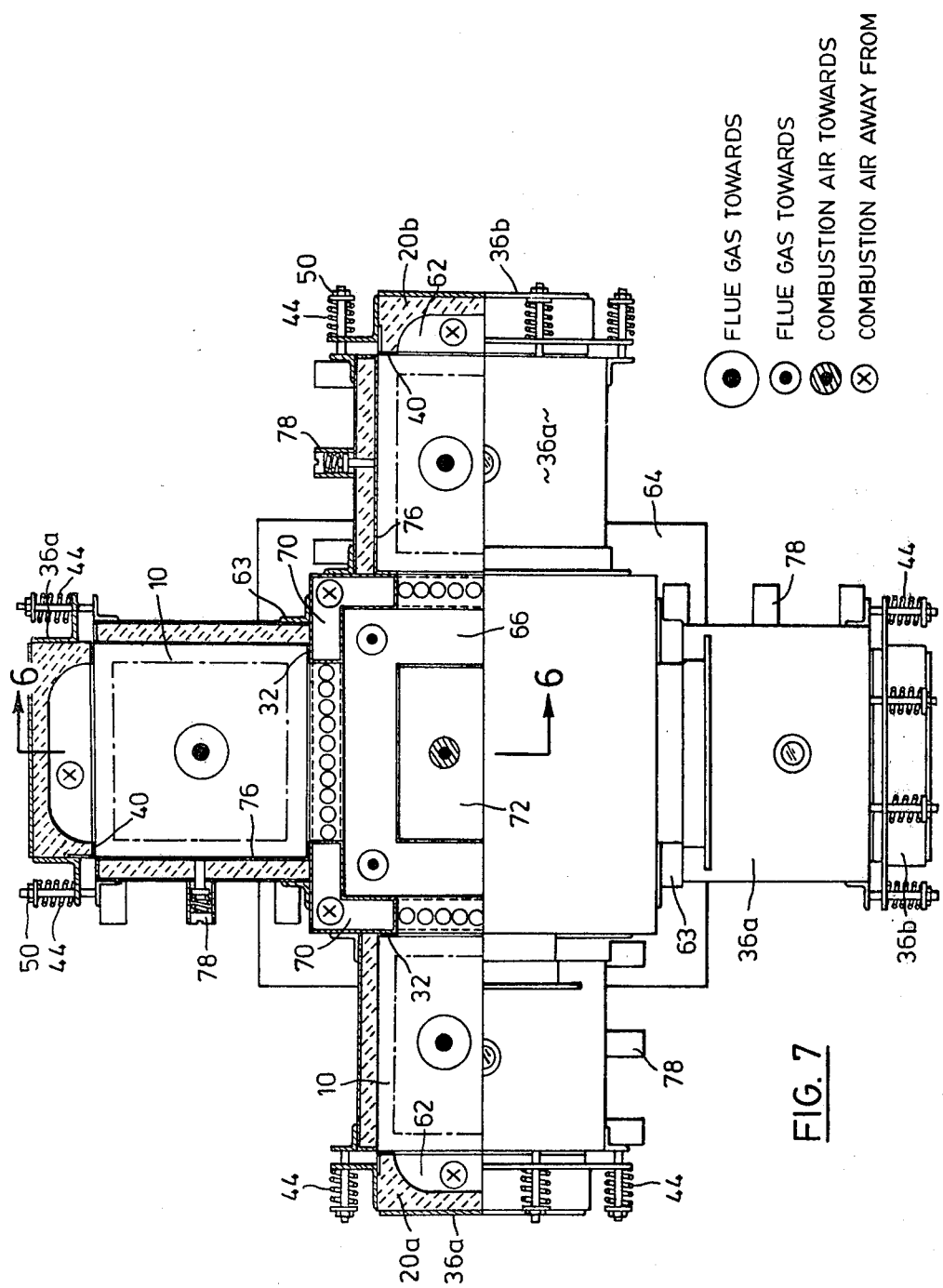
FIG. 7 is a part end elevation and part cross-section, the lower part being the end elevation in the direction of arrow Y in FIG. 5, while the upper part is a cross-section on the line A—A of FIG. 6.

The cold combustion air enters the central trunk casing 62 via common inlet 69, the single stream dividing into four separate streams which pass through respective passages 70 to the respective core inlet face 12. Referring particularly to FIG. 6 it is a particular feature of this construction that the outlet walls of the passages 70 serve as supports for the core sealing gaskets 32 so that these gaskets are maintained at the lowest practical temperature by the incoming cool air. In this embodiment each core provides two passes for the combustion air, as with the embodiment of FIG. 3, and the body part 20b therefore provides the respective transfer plenum 62. The heated combustion air issuing from core outlet face 14 passes out through outlet 58 to a common central passage 72 and thence to common outlet 74.

It will be seen therefore that I have provided a casing for a plurality of cores in which from one to four cores can be employed, the unwanted cores and casings being removed and replaced by simple closure plates. At any time the capacity of a system using less than four cores can be upgraded to the maximum by adding further cores. Each portion of the casing enclosing a core has the advantages of core replacement and sealing as described and claimed in my U.S. Pat. No. 4,262,740, issued Apr. 21, 1981.

It has been found advantageous to include in each body 20a between the body and the respective core, a pressure plate 76 that is urged by compression springs 78 into contact with the wall of the respective core so as to oppose any tendency of the core to separate under the extreme conditions of temperature to which it is subjected.

The application of the casings of the invention to a burner/recuperator structure will be apparent to those skilled in the art by a comparison of the figures of the present drawings with those of my U.S. Ser. No. 4,262,740, issued Apr. 21, 1981, which shows in FIGS. 1 and 2 a specific form of such a burner/recuperator structure. Although the invention has been illustrated as applied to a four-sided central trunk member it will be apparent that it can be applied to other trunk constructions, such as two, three, five, six and more sides.

I claim:

1. A casing for a heat exchanger core which has therein a first plurality of parallel passages extending between two opposite faces of the body and constituting a first fluid flow path having an inlet and an outlet and a second plurality of parallel passages extending between two other opposite faces of the body and constituting a second fluid flow path having an inlet and an outlet and in heat exchange communication with the first path, the casing including:

a hollow casing body having an internal shoulder to be engaged by a respective face of the core and surrounding a respective fluid path inlet or outlet from the casing body;

a first gasket interposed between the shoulder and the edges of the abutting core face;

a second gasket mounted on the edges of the core face opposite to the said abutting face to seal the join between the said core edges and the casing body;

a gasket compressor member engaging the gasket face of the second gasket opposite to that engaged with the core face edges; and resilient means operative between the gasket compressor member and the casing body to urge the compressor member toward the core face and thereby compress the gaskets into sealing engagement with the respective core edges and the casing body;

wherein the said hollow casing body comprises a central portion thereof of a thickness to just accommodate a respective heat exchanger core;

a first end portion removably mounted on said central portion and providing a respective plenum for gases passing through the core;

and wherein the said gasket compressor member comprises a second end portion of the hollow casing body providing another respective plenum for gases passing through the core.

2. A casing as claimed in claim 1, wherein the first end portion provides the inlet to the respective flow path and a gas distribution plenum for distributing gases over the corresponding inlet face of the core, and the second end portion provides the outlet from the flow path and a gas collection plenum for collection of gases issuing from the corresponding outlet face of the core.

3. A casing as claimed in claim 1, wherein the said second end portion provides both the inlet to and the outlet from the respective flow path, and respective gas distribution and collection plenums for gases respectively entering and leaving the core, the said plenums being separated by a barrier member engaging the respective face of the core via the respective gasket, and wherein the said first end portion provides a transfer plenum for gases leaving and re-entering the core.

4. A casing as claimed in claim 1, wherein both the said first and second end portions provide one of the inlet to and the outlet from the respective flow path, and each of them provides a transfer plenum for gases leaving and re-entering the core, each inlet or outlet being separated from the respective transfer plenum by a respective barrier member engaging the respective face of the core via the respective gasket.

5. A casing for a heat exchanger core which has therein a first plurality of parallel passages extending between two opposite faces of the body and constituting a first fluid flow path having an inlet and an outlet and a second plurality of parallel passages extending between two other opposite faces of the body and constituting a second fluid flow path having an inlet and an outlet and in heat exchange communication with the first path, the casing including;

a hollow casing body having an internal shoulder to be engaged by a respective face of the core and surrounding a respective fluid path inlet or outlet from the casing body;

a first gasket interposed between the shoulder and the edges of the abutting core face;

a second gasket mounted on the edges of the core face opposite to the said abutting face to seal the join between the said core edges and the casing body;

a gasket compressor member engaging the gasket face of the second gasket opposite to that engaged with the core face edges;

resilient means operative between the gasket compressor member and the casing body to urge the compressor member toward the core face and thereby compress the gaskets into sealing engagement with the respective core edges and the casing body;

the casing also including a central trunk casing member having common gas inlets thereto for the respective flow paths and common gas outlets therefrom for the respective flow paths; and means for mounting a plurality of said hollow casing bodies on the central trunk casing member each with its inlets connected to the common trunk inlets and its outlets connected to the common trunk outlets.

6. A casing as claimed in claim 5, wherein the central trunk casing member is of square cross-section and is provided with means for mounting four hollow casing bodies thereon, one on each face of the section.

7. A casing as claimed in claim 5, wherein the passages for gas to be heated and for gas that has been heated are concentric with one another, the passage for gas to be heated is the outermost passage, and the wall of said outermost passage serves to support the adjacent gaskets for the hollow casing bodies.

8. A casing as claimed in claim 5, wherein the passages for gas to be heated, gas that has been heated, and gas that has been cooled are concentric with one another, the passage for gas to be heated is the outermost passage, and the wall of said outermost passage serves to support the adjacent gaskets for the hollow casing bodies.

* * * * *